United States Patent
Kang et al.

(10) Patent No.: US 8,045,448 B2
(45) Date of Patent: Oct. 25, 2011

(54) APPARATUS AND METHOD FOR DETECTING PACKET OF ZERO-PADDED OFDM SIGNAL

(75) Inventors: Kyu-Min Kang, Daejon (KR); Sang-In Cho, Daejon (KR); Sangsung Choi, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 433 days.

(21) Appl. No.: 12/189,931

(22) Filed: Aug. 12, 2008

(65) Prior Publication Data

US 2009/0147667 A1    Jun. 11, 2009

(30) Foreign Application Priority Data

Dec. 10, 2007    (KR) .......................... 10-2007-0127737

(51) Int. Cl.
*H04J 11/00*    (2006.01)
(52) U.S. Cl. .......................................................... 370/208
(58) Field of Classification Search .................. 370/203, 370/208, 210, 241, 389, 229, 310, 235, 392
See application file for complete search history.

(56) References Cited

U.S. PATENT DOCUMENTS

| | | | |
|---|---|---|---|
| 7,158,541 B2 | 1/2007 | Sawada et al. | |
| 7,539,241 B1 * | 5/2009 | Dick | 375/152 |
| 7,567,533 B2 * | 7/2009 | Lai | 370/330 |

FOREIGN PATENT DOCUMENTS

| | | |
|---|---|---|
| JP | 2003-143106 | 5/2003 |
| KR | 10-0464009 | 12/2004 |
| KR | 10-0585173 B1 | 5/2006 |
| KR | 10-2006-0068422 A | 6/2006 |
| KR | 10-2007-0014194 A | 1/2007 |

OTHER PUBLICATIONS

Korean Notice of Allowance issued on Apr. 29, 2009 in corresponding Korean Patent Application 10-2007-0127737.
Alan J. Coulson, "Maximum Likelihood Synchronization for OFDM Using a Pilot Symbol: Algorithms" (*2001 IEEE Journal on Selected Areas in Communications*, vol. 19, No. 12, pp. 2486-2494, Dec. 2001).

* cited by examiner

*Primary Examiner* — Kwang B Yao
*Assistant Examiner* — Anh Ngoc Nguyen
(74) *Attorney, Agent, or Firm* — Staas & Halsey LLP

(57) ABSTRACT

Provided is an apparatus and method for detecting a packet of a zero-padded OFDM signal, which are capable of determining if a packet exists in a reception (RX) signal by comparing a cross-correlation value of an OFDM signal delayed by a predetermined sample time, e.g., a zero-padded sample time, with a power value of the RX signal, thereby increasing a packet detection probability and preventing a false alarm. The packet detecting apparatus includes: a cross-correlation calculator for calculating a cross-correlation value of a reception signal received from the outside and delaying the calculated cross-correlation value by a predetermined sample time; a power calculator for calculating a power value of the reception signal; and a packet detector for determining if a packet exists in the reception signal by comparing the delayed cross-correlation value with the calculated power value, and detecting the corresponding packet.

18 Claims, 4 Drawing Sheets

APPARATUS AND METHOD FOR DETECTING PACKET OF ZERO-PADDED OFDM SIGNAL

CROSS-REFERENCE(S) TO RELATED APPLICATIONS

The present invention claims priority of Korean Patent Application No. 10-2007-0127737, filed on Dec. 10, 2007, which is incorporated herein by reference.

BACKGROUND OF THE INVENTION

1. Field of the Invention

The present invention relates to an apparatus and method for detecting a packet of an Orthogonal Frequency Division Multiplexing (OFDM) signal; and, more particularly, to an apparatus and method for detecting a packet of a zero-padded OFDM signal, which are capable of determining if a packet exists in a reception (RX) signal by comparing a cross-correlation value of an OFDM signal delayed by a predetermined sample time, e.g., a zero-padded sample time, with a power value of the RX signal, thereby increasing a packet detection probability and preventing a false alarm.

This work was supported by the IT R&D program of MIC/IITA [2006-S-071-02, "Development of UWB Solution for High Speed Multimedia Transmission"].

2. Description of Related Art

A conventional packet detector for an OFDM system separately calculates a cross-correlation value and a power value of an RX signal. The conventional packet detector determines whether a packet of the RX signal is detected or not by comparing a cross-correlation value of a preamble sample with a value obtained by multiplying the power value of the RX signal by a preset threshold value.

An operation of the conventional packet detector will be described below in detail.

The conventional packet detector for the OFDM system calculates cross-correlation values of N preamble samples by using a cross-correlation function, which is expressed as the following Equation 1.

$$Cor(n) = \left| \sum_{i=0}^{N-1} r(n-i) p^*(N-1-i) \right|^2 \qquad \text{Eq. 1}$$

where Cor(n) is a cross-correlation value at an n-th sample time, r(n) is the RX signal received at the n-th sample time, and p*(j)(j=0, ..., N-1) is a conjugate complex number of a j-th preamble sample previously stored in a packet detector of a receiver.

In Equation 1, $|a|^2 = Re(a)^2 + Im(a)^2$, where $|a|^2$ is a value obtained by summing a square of a real part of the complex number "a" and a square of an imaginary part of the complex number "a".

The conventional packet detector for the OFDM system calculates the power values of the RX signal, based on the following Equation 2. That is, the conventional packet detector sums the square of the real part and the square of the imaginary part of the RX signal received at each sample time and stores the resulting values in N buffers. Then, the conventional packet detector calculates the power values of the RX signal by summing the squares of the RX signal stored in the N buffers.

$$Pow(n) = \sum_{i=0}^{N-1} |r(n-i)|^2 \qquad \text{Eq. 2}$$

where Pow(n) is the power value at an n-th sample time, and r(n) is the RX signal received at the n-th sample time.

Then, the conventional packet detector multiplies the power value of the RX signal, which is calculated using Equation 2, by a preset threshold value (Threshold_value), as expressed in the following Equation 3.

The conventional packet detector determines if the cross-correlation value Cor(n) calculated using Equation 1 is greater than the value obtained by multiplying the power value Pow(n) calculated using Equation 2 by the threshold value Threshold_value, as expressed in the following Equation 3. The power related threshold value is applied to a packet detection process of the packet detector after an optimal value is selected through a simulation and test under a variety of channel environments.

$$Cor(n) > Pow(n) \times \text{Threshold\_value} \qquad \text{Eq. 3}$$

where Cor(n) is the cross-correlation value at the n-th sample time, Pow(n) is the power value of the RX signal received at the n-th sample time, and Threshold_value is the preset power related threshold value.

If the cross-correlation value Cor(n) is greater than the value obtained by multiplying the power value Pow(n) by the threshold value Threshold_value, the conventional packet detector determines the packet as being detected from the RX signal.

If the cross-correlation value Cor(n) is greater than the value obtained by multiplying the power value Pow(n) by the threshold value Threshold_value, the conventional packet detector determines the packet as being detected from the RX signal, transmits the determination value to a controller of a receiver, and terminates the packet detection process.

The conventional packet detector for the OFDM system has a problem in that a packet detection probability is reduced in a channel environment where multi-path is serious. This is because the cross-correlation value in the channel environment where the multi-path is serious becomes relatively smaller than the cross-correlation value in a channel environment where no multi-path exists. The packet detection process is performed by comparing the cross-correlation value with the value obtained by multiplying the power value Pow(n) by the power related threshold value Threshold_value. Thus, if the cross-correlation value becomes small, the packet detection probability will be reduced.

In addition, the conventional packet detector for the OFDM system has a problem in that a false alarm increases in a channel to which additive white Guassian Noise (AWGN) is applied. For example, when a signal-to-noise ratio (SNR) of an RX signal is 0 dB in an ultra wide-band (UWB) channel environment, a false alarm may occur at more than 10% of transmission frames and a packet detection may frequently fail.

Furthermore, in the case of the OFDM system that transmits the preamble pattern generated by repeating a code set with a predetermined length, if a cross-correlation value is calculated through the conventional packet detector, a peak value is obtained at a reference position, but a cross-correlation value with a predetermined magnitude is periodically obtained at positions other than the reference position. If the conventional packet detection method is applied with the power related threshold value set to a small value, the packet may be frequently detected at undesired positions other than the reference position.

SUMMARY OF THE INVENTION

An embodiment of the present invention is directed to providing an apparatus and method for detecting a packet of an OFDM signal, which are capable of preventing a packet detection probability from being reduced in a poor environment, such as a channel with serious multi-path a channel greatly influenced by white noise, and preventing synchronization mismatch due to a packet detection at positions other than a reference position in an OFDM system.

Another embodiment of the present invention is directed to providing an apparatus and method for detecting a packet of a zero-padded OFDM signal, which are capable of determining if a packet exists in an RX signal by comparing a cross-correlation value of an OFDM signal delayed by a predetermined sample time, e.g., a zero-padded sample time, with a power value of the RX signal, thereby increasing a packet detection probability and preventing a false alarm.

To overcome the above-described problems, the apparatus and method of the present invention determines if a packet exists in a reception (RX) signal by comparing a cross-correlation value of an OFDM signal delayed by a predetermined sample time, e.g., a zero-padded sample time, with a power value of the RX signal, thereby increasing a packet detection probability and preventing a false alarm.

In accordance with an aspect of the present invention, there is provided a packet detecting apparatus, including: a cross-correlation calculator for calculating a cross-correlation value of a reception signal received from the outside and delaying the calculated cross-correlation value by a predetermined sample time; a power calculator for calculating a power value of the reception signal; and a packet detector for determining if a packet exists in the reception signal by comparing the delayed cross-correlation value with the calculated power value, and detecting the corresponding packet.

In accordance with another aspect of the present invention, there is provided a packet detecting method, including: calculating a cross-correlation value of a reception signal received from the outside, and delaying the calculated cross-correlation value by a predetermined sample time; calculating a power value of the reception signal; and determining if a packet exists in the reception signal by comparing the delayed cross-correlation value with the calculated power value, and detecting the corresponding packet.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
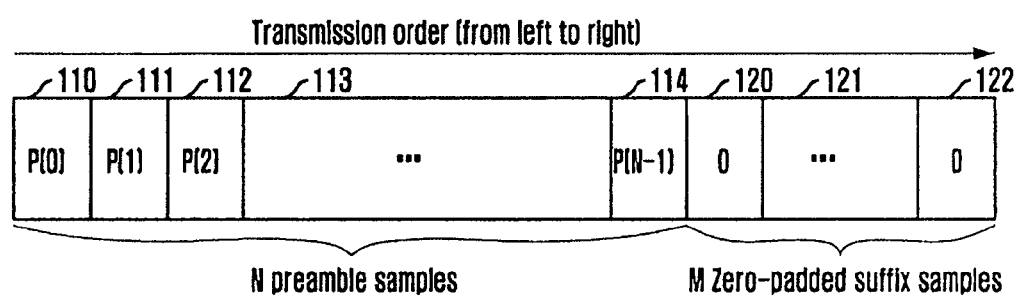
FIG. 1 illustrates a configuration of an OFDM symbol in a preamble transmission interval of a zero-padded OFDM signal.

FIG. 1 illustrates a configuration of an OFDM symbol in a preamble transmission interval of a zero-padded OFDM signal.

Referring to FIG. 1, one zero-padded OFDM symbol includes N time-domain preamble samples 110, 111, 112, 113 and 114, and M zero-padded suffix samples 120, 121 and 122. At this point, the OFDM transmission system transmits the samples in the following order: the P(0) preamble sample 110, the P(1) preamble sample, . . . , the P(N−1) preamble sample 114, and the M zero-padded suffix samples 120, 121 and 122.

Figure 2:
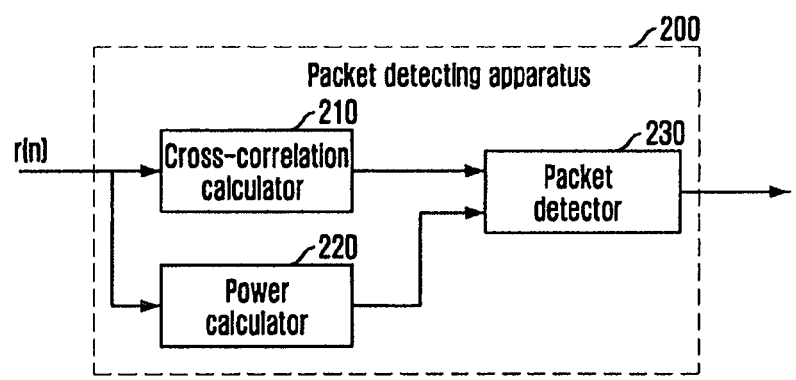
FIG. 2 is a block diagram of an apparatus for detecting a packet of an OFDM signal in accordance with an embodiment of the present invention.

FIG. 2 is a block diagram of an apparatus for detecting a packet of an OFDM signal in accordance with an embodiment of the present invention.

Referring to FIG. 2, the apparatus 200 for detecting the packet of the OFDM signal (hereinafter, referred to as a packet detecting apparatus) includes a cross-correlation calculator 210, a power calculator 220, and a packet detector 230.

The components of the packet detecting apparatus will be described below.

The cross-correlation calculator 210 calculates a cross-correlation value of a zero-padded OFMD signal received from the outside and delays the calculated cross-correlation value by a zero-padded sample time. The zero-padded OFDM signal may be represented with a baseband digital complex number RX signal. The cross-correlation calculator 210 will be described later in detail with reference to FIG. 3.

The power calculator 220 accumulates a power value of the zero-padded OFDM signal during an interval defined below the zero-padded sample time. The power calculator 220 will be described later in detail with reference to FIG. 4.

The packet detector 230 determines if a packet exists in the RX signal by comparing the cross-correlation value delayed by the cross-correlation calculator 210 with the power value calculated by the power calculator 220. The packet detection process of the packet detector 230 will be described later with reference to the following Equations 7 and 8.

Figure 3:
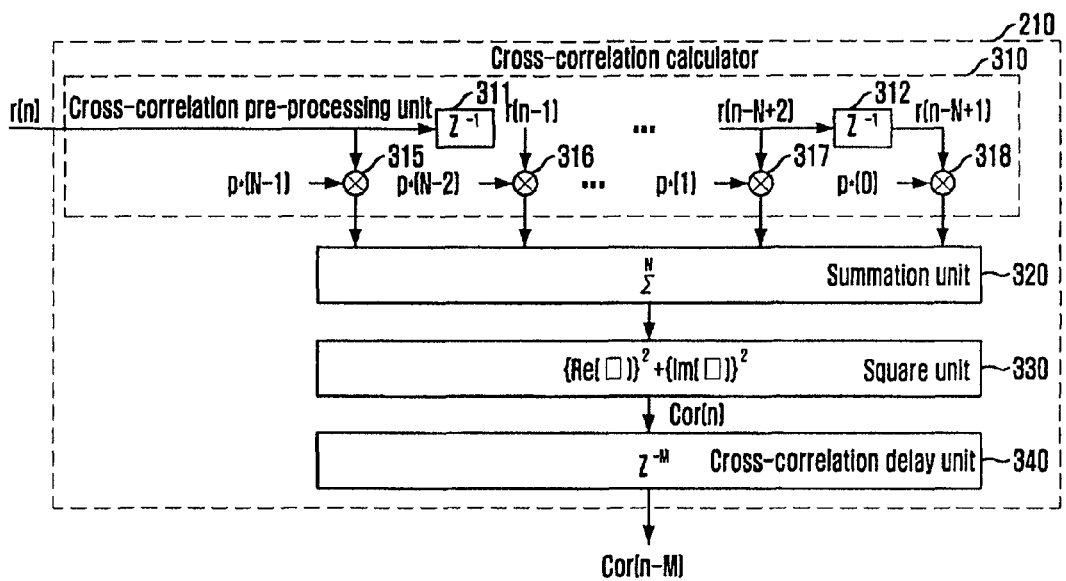
FIG. 3 is a detailed block diagram of a cross-correlation calculator of FIG. 2 in accordance with an embodiment of the present invention.

FIG. 3 is a detailed block diagram of the cross-correlation calculator of FIG. 2 in accordance with an embodiment of the present invention.

Referring to FIG. 3, the cross-correlation calculator 210 includes a cross-correlation pre-processing unit 310, a summation unit 320, a square unit 330, and a cross-correlation delay unit 340. The cross-correlation pre-processing unit 310 includes N−1 delayers 311 and 312 and multipliers 315 to 318. The N−1 delayers 311 and 312 delay a digital complex number RX signal r(n−j) (j=0, 1, ..., N−1) by a sample time and store the delayed signals in buffers.

The cross-correlation calculator 210 calculates a cross-correlation value Cor(n) of the baseband digital complex number RX signal r(n−j) (j=0, 1, ..., N−1) received from the outside, and delays the calculated cross-correlation value Cor(n) by an M-sample time. That is, the cross-correlation calculator 210 calculates a cross-correlation value Cor(n−M) delayed by the M-sample time.

The components of the cross-correlation calculator 210 will be described below.

The cross-correlation pre-processing unit 310 stores the baseband digital complex number RX signals r(n−j) (j=0, 1, ..., N−1) in N buffers. The cross-correlation pre-processing unit 310 multiplies the digital complex number RX signals r(n−j) (j=0, 1, ..., N−1) stored in the N buffers by N preamble pattern conjugate complex numbers p*(j), (j=0, ..., N−1) previously stored in a memory of a receiver. In other words, the first delayer 311 among the N−1 delayers 311 and 312 delays the digital complex number RX signal r(n−j) (j=0, 1, ..., N−1) by one sample time, and next delayers sequentially delays the reception signals stored in the buffers by the sample time. Consequently, the digital complex number RX signal r(n−j) (j=0, 1, ..., N−1) output from the (N−1)-th delayer 312 is delayed by the (N−1)-sample time. The digital complex number RX signals r(n−j) (j=0, 1, ..., N−1) stored in the N buffers are respectively multiplied by the N preamble pattern conjugate complex numbers p*(j),(j=0, ..., N−1).

The summation unit 320 sums a value of a real part and a value of an imaginary part with respect to each of the N resulting values obtained by multiplying the RX signal r(n−j) (j=0, 1, ..., N−1) by the N preamble pattern conjugate complex numbers at the cross-correlation pre-processing unit 310.

The square unit 330 calculates a square of an absolute value, that is, the cross-correlation value Cor(n) of the reception signal r(n−j) (j=0, 1, ..., N−1), by squaring the value of the real part and the value of the imaginary part and summing the squared values.

The cross-correlation delay unit 340 delays the cross-correlation value Cor(n) output from the square unit 330 by an M-sample time, that is, the zero-padded sample time, and outputs the cross-correlation value Cor(n−M) delayed by the M-sample time.

The process of calculating the cross-correlation value Cor(n−M) delayed by the M-sample time at the cross-correlation calculator 210 is performed based on the following Equation 4.

$$Cor(n-M) = \left| \sum_{i=0}^{N-1} r(n-M-i) p^*(N-1-i) \right|^2 \quad \text{Eq. 4}$$

where Cor(n−M) is the cross-correlation value delayed by the M-sample time, p*(N−1−i) is the conjugate complex number of the preamble sample, and r(n−M−i) is the RX signal delayed by the M-sample time.

At this point, the conjugate complex number p*(N−1−i) of the preamble sample is not used as it is, but only its sign component may be stored in a memory (not shown) of a receiver and then used later. That is, the cross-correlation value Cor(n−M) delayed by the M-sample time may be calculated using only the sign component of the conjugate complex number p*(N−1−i) of the preamble sample, as expressed in the following Equation 5.

$$Cor(n-M) = \left| \sum_{i=0}^{N-1} r(n-M-i) \cdot \text{sign}\{p^*(N-1-i)\} \right|^2 \quad \text{Eq. 5}$$

where sign{p*(N−1−i)} is the sign component of the conjugate complex number of the preamble sample, r(n−M−i) is the RX signal delayed by the M-sample time, and Cor(n−M) is the cross-correlation value delayed by the M-sample time.

Figure 4:
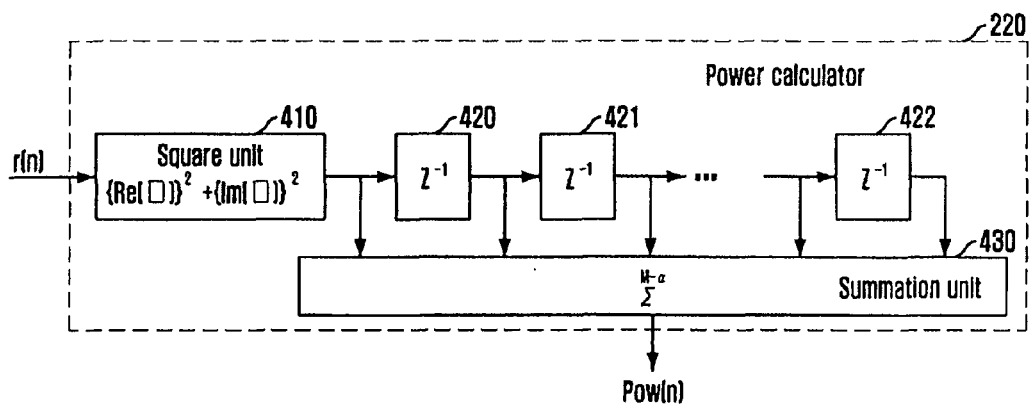
FIG. 4 is a detailed block diagram of a power calculator shown in FIG. 2 in accordance with an embodiment of the present invention.

FIG. 4 is a detailed block diagram of the power calculator of FIG. 2 in accordance with an embodiment of the present invention.

Referring to FIG. 4, the power calculator 220 includes a square unit 410, M−1−α delay units 420 to 422, and a summation unit 430.

The square unit 410 calculates a square of an absolute value of the baseband digital complex number RX signal r(n−j) (j=0, 1, ..., N−1). That is, the square unit 410 calculates the power value by summing squares of the real part and the imaginary part of the digital complex number RX signal r(n−j) (j=0, 1, ..., N−1).

The M−1−α delay units 420 to 422 stores the real parts and the imaginary parts squared and summed by the square unit 410 in M−1−α buffers. In other words, the first delay unit 420 among the M−1−α delay units 420 to 422 delays the square of the absolute value of the digital complex number RX signal r(n−j) (j=0, 1, ..., N−1) by one sample time, and the next delay unit 421 sequentially delays the output of the first delay unit 420. Consequently, the (M−1−α)-th delay unit 422 outputs the power value delayed by an (M−1−α)-sample time.

The summation unit 430 sums the power value output from the square unit 410 and the M−α power values output from the M−1−α delay units 420 to 422 and outputs the final power value Pow(n) of the RX signal, which is expressed as the following Equation 6.

$$Pow(n) = \sum_{i=0}^{M-1-\alpha} |r(n-i)|^2 \quad \text{Eq. 6}$$

where Pow(n) is the power value of the reception signal, α is an integer greater than or equal to zero and less than M, and M−α is the number of the buffers.

When the power calculator 220 calculates the power value Pow(n) of the RX signal, the number of the buffers is set to a value of M−α, which is less than the number (M) of the zero-padded suffix samples by α. Since the power greater than that of the zero-padded suffix sample may be measured at the receiver due to the multi-path, the above-described process aims to reduce the influence of the multi-path and thus minimize the power value of the RX signal.

In other words, the above-described process aims to minimize the influence of the multi-path because a significantly high power may be measured at the receiver during several sample intervals due to the influence of the multi-path even though the signal is not output after transmitting the N preamble samples. Therefore, in the power calculator 220, the intervals for calculating the power value of the RX signal is set to less than the size of the zero-padded suffix samples.

Furthermore, in order to set the number of the buffers to an even number, the number of the buffers is set to a value of M−α, which is obtained by subtracting α from the number of the zero-padded suffix samples. If the number of the buffers is even, the power calculator 220 can be easily implemented in hardware.

Meanwhile, the packet detector 230 compares the cross-correlation value delayed at the cross-correlation calculator 210 of FIG. 2 with the value obtained by multiplying the power value of the RX signal calculated at the power calculator 220 of FIG. 2 by the first threshold value Th1, based on the following Equation 7.

When the power value of the cross-correlation value Cor(n−M) is greater than the power value Pow(n)×Th1, the packet detector 230 determines that the packet exists in the RX signal.

In order to reduce the number of times of the false alarm, the packet detector 230 can perform the packet detection process when the cross-correlation value is greater than a first false alarm threshold value Th2, as expressed in the following Equation 7. The first threshold value and the first false alarm threshold value are applied to the apparatus for detecting the packet after selecting an optimal value through a simulation and test in a variety of channel environments.

$$(Cor(n-M) > Pow(n) \times Th1) \ \& \ (Cor(n-M) > Th2) \qquad \text{Eq. 7}$$

where Cor(n−M) is the cross-correlation value delayed by the M-sample time, Th1 is the first threshold value, Th2 is the first false alarm threshold value, and Pow(n) is the power value of the RX signal.

In other words, the packet detector 230 determines that the packet is detected when the cross-correlation value Cor(n−M) delayed by the M-sample time is greater than the first false alarm threshold value and greater than the value obtained by multiplying the power value Pow(n) of the RX signal by the first threshold value Th1. Thereafter, the packet detector 230 terminates the first packet detection process.

Then, the packet detector 230 determines if the counter value falls within a second packet detection interval. When it is determined that the counter value falls within the second packet detection interval, the packet detector 230 performs the second packet detection process, based on the following Equation 8 similar to Equation 7 above.

The packet detector 230 includes a counter to increase the counter value by one in each packet detection process. The packet detector 230 determines that the current interval is the second packet detection interval when the counter value falls within the second the packet detection interval. On the contrary, the packet detector 230 determines the current interval is not the second packet detection interval when the counter value does not fall within the second packet detection interval.

When the current interval is determined as the second packet detection interval, the packet detector 230 performs the second packet detection process during the corresponding interval. The packet detector 230 determines if the cross-correlation value Cor(n−M) delayed by the M-sample time is greater than a second false alarm threshold value Th3 by comparing the cross-correlation value Cor(n−M) with the second false alarm threshold value Th3.

The second false alarm threshold value Th3 is less than or equal to the first false alarm threshold value Th2 used in the first packet detection process. Since the packet detector 230 uses the second false alarm threshold value Th3 less than or equal to the first false alarm threshold value Th2, it can increase the packet detection probability in a channel environment where signal quality is poor.

$$(Cor(n-M) > Pow(n) \times Th1) \ \& \ (Cor(n-M) > Th3) \qquad \text{Eq. 8}$$

The packet detector 230 determines that the packet is detected when the cross-correlation value Cor(n−M) delayed by the M-sample time is greater than the second false alarm threshold value Th3 and greater than the value obtained by multiplying the power value Pow(n) of the RX signal with the first threshold value. Then, the packet detector 230 transmits the value to the controller of the receiver and terminates the packet detection process.

Figure 5:
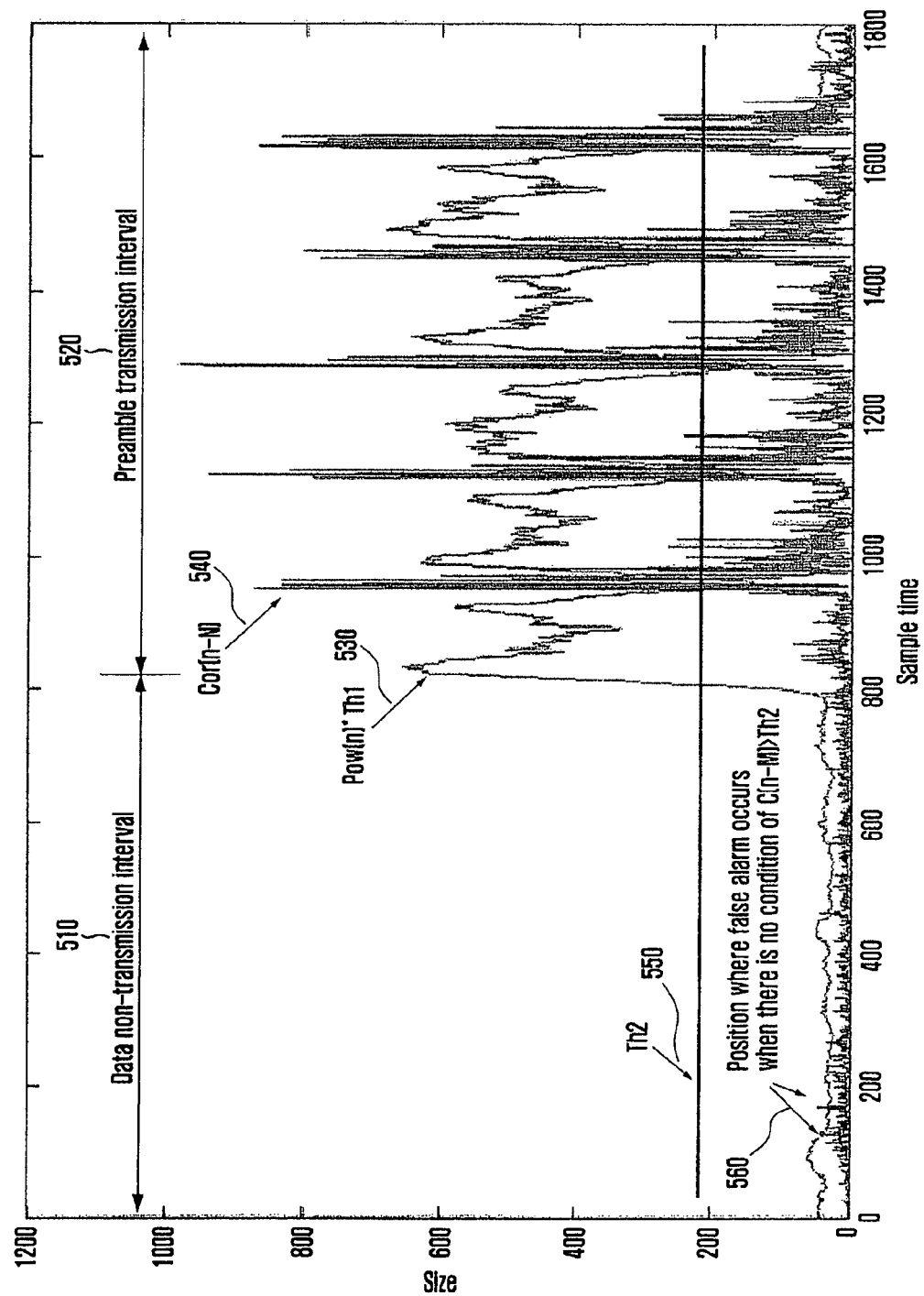
FIG. 5 is an exemplary graph illustrating a cross-correlation value and a power value of the RX signal according to a transmission of an OFDM preamble sequence.

FIG. 5 is an exemplary graph illustrating the cross-correlation value and the power value of the RX signal according to the transmission of the OFDM preamble sequence.

In FIG. 5, the simulation result obtained at an arbitrary channel when the SNR of an RX signal is 10 dB in a UWB channel environment is illustrated in two intervals: a data non-transmission interval 510 and a preamble transmission interval 520.

When the packet detector detects the packet in the preamble transmission interval, the power value Pow(n) 530 of the RX signal has the minimum value within a predetermined range where the cross-correlation value Cor(n−M) 540 delayed by the M-sample time is maximum. That is, compared with the conventional packet detector, the difference between the cross-correlation value and the power value increases to the maximum value in the M-sample-delayed interval.

When the packet detector detects the packet in the data non-transmission interval, it determines if the cross-correlation value Cor(n−M) 540 delayed by the M-sample time is greater than the first false alarm threshold value Th2 550 in order to prevent the false alarm 560. If the packet detector does not perform the process of determining if the cross-correlation value Cor(n−M) 540 delayed by the M-sample time is greater than the first false alarm threshold value Th2 550, the false alarm 560 occurs so that the packet is detected not at a packet detection position but a noise interval.

Figure 6:
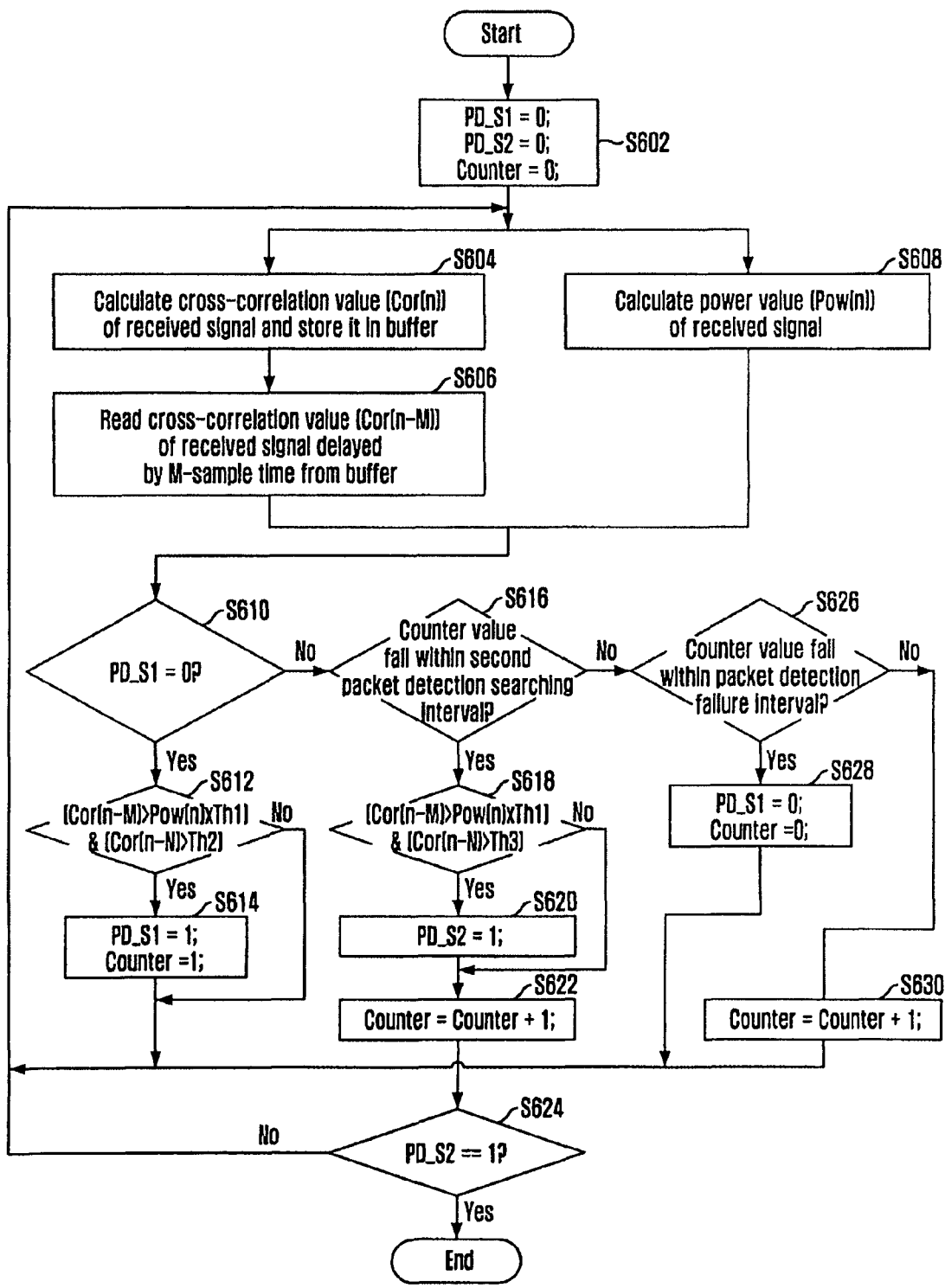
FIG. 6 is a flowchart illustrating a method for detecting a packet of an OFDM signal in accordance with an embodiment of the present invention.

FIG. 6 is a flowchart illustrating a method for detecting a packet of an OFDM signal in accordance with an embodiment of the present invention.

The packet detecting method in accordance with the embodiment of the present invention is performed in each OFDM preamble transmission interval.

In operation S602, the packet detector 230 resets a first packet detection success/failure determining value PD_S1, a second packet detection success/failure determining value PD_S2, and a counter value to zero.

In operation S604, the cross-correlation calculator 210 calculates the cross-correlation value and stores the calculated cross-correlation value in the buffer. In operations S606 and S608, the packet detector 230 reads the cross-correlation value delayed by the M-sample time from the buffer, and the power calculator 220 calculates the power value of the RX signal received at the same time.

In operation S610, the packet detector 230 determines if the first packet detection success/failure determining value PD_S1 is zero in each packet searching interval.

When it is determined in operation S610 that the first packet detection success/failure determining value PD_S1 is zero, the packet detector 230 performs the first packet detection process in each packet searching interval. That is, in operation S612, the packet detector 230 determines if the cross-correlation value Cor(n−M) delayed by the M-sample is greater than the first false alarm threshold value and greater than the value obtained by multiplying the power value Pow(n) of the RX signal by the first threshold value Th1, as expressed in Equation 7 above.

When the first packet detection condition is satisfied in operation S612, the packet detector 230 determines that the first packet detection succeeds, and sets the first packet detection success/failure determining value PD_Si and the counter value to "1" in operation S614. Then, the process returns to operations S604 and S608.

When it is determined in operation S610 that the first packet detection success/failure determining value PD_S1 is "1", the packet detector 230 determines if the counter value falls within the second packet detection searching interval in operation S616.

When it is determined in operation S616 that the counter value falls within the second packet detection searching interval, the packet detector 230 performs the second packet detection process. That is, in operation S618, the packet detector 230 determines if the cross-correlation value Cor(n−M) delayed by the M-sample time is greater than the second false alarm threshold value Th3 and greater than the value obtained by multiplying the power value Pow(n) of the RX signal by the first threshold value during the second packet detection process, as expressed in Equation 8 above.

When the second packet detection condition is satisfied in operation S618, the packet detector 230 determines that the second packet detection succeeds and therefore it set the second packet detection success/failure determining value PD_2 to "1" in operation S620. That is, the packet detector 230 detects the packet at a specific interval in each packet detection searching interval and determines that the packet exists in the RX signal when the cross-correlation value delayed by the M-sample time exceeds the second false alarm threshold value less than the first false alarm threshold value in the following interval.

For reference, the second packet detection searching interval may be set to an interval ranging from several samples to tens of samples. In operation S622, the packet detector 230 increases the counter value by one. On the contrary, when the second packet detection condition is not satisfied in operation S618, the packet detector 230 proceeds to operation S622.

In operation S624, the packet detector 230 determines if the second packet detection success/failure determining value PD_S2 is "1". The packet detector 230 terminates the packet detection process when the second packet detection success/failure determining value PD_S2 is "1", and returns to operations S604 and S608 when the second packet detection success/failure determining value PD_S2 is not "1".

Meanwhile, it is determined in operation S616 that the counter value does not fall within the second packet detection searching interval, the packet detector 230 determines if the counter value falls within the packet detection failure checking interval in operation S626.

When it is determined in operation S626 that the counter value falls within the packet detection failure checking interval, the packet detector sets the first packet detection success/failure determining value PD_S1 and the counter value to "0" in operation S628 and then returns to operations S604 and S608.

In accordance with the embodiments of the present invention, the packet detection probability can be significantly increased because the packet is detected using the cross-correlation value delayed by the M-sample time and the signal power value accumulated during the interval prior to the M samples. Hence, the packet detection performance of the zero-padded OFDM transmission system can be improved.

Furthermore, the number of the false alarms can be reduced and the packet detection probability can also be increased because the packet is detected through two stages, that is, the packet detection is performed using the first threshold value and the packet detection is re-performed using the second threshold value set to less than the first threshold value.

The methods for detecting the packet of the zero-padded OFDM signal in accordance with the embodiments of the present invention can be realized as a computer program. Codes and code segments constructing the program can be easily construed by computer programmers skilled in the art to which the present invention pertains. In addition, the program is stored in a computer-readable recording medium (data storage medium) and is read and executed by a computer. The computer-readable recording medium is any data storage device that can store data which can be thereafter read by a computer system.

While the present invention has been described with respect to the specific embodiments, it will be apparent to those skilled in the art that various changes and modifications may be made without departing from the spirit and scope of the invention as defined in the following claims.

What is claimed is:

1. A packet detecting apparatus, comprising:
a cross-correlation calculator for calculating a cross-correlation value of a reception signal received from the outside and delaying the calculated cross-correlation value by a predetermined sample time;
a power calculator for calculating a power value of the reception signal; and
a packet detector for determining if a packet exists in the reception signal by comparing the delayed cross-correlation value with the calculated power value, and detecting the corresponding packet,
wherein the reception signal includes a zero-padded symbol;
the zero-padded symbol includes time-domain preamble samples and zero-padded suffix samples;
the cross-correlation calculator delays the reception signal by a zero-padded sample time;
the cross-correlation calculator delays the reception signal by a time-domain preamble samples time;
the cross-correlation calculator delays the reception signal by a zero-padded suffix samples time; and
the power calculator accumulates the power value during an interval defined below the zero-padded sample time.

2. The packet detecting apparatus of claim 1, wherein the cross-correlation calculator calculates the cross-correlation value by using a sign component of a conjugate complex number of a preamble sample included in the reception signal.

3. The packet detecting apparatus of claim 1, wherein the packet detector determines if the packet exists in the reception signal in each packet searching interval, and determines that the packet exits in the reception signal when the delayed cross-correlation value is greater than a predetermined power value.

4. The packet detecting apparatus of claim 3, wherein the packet detector determines that the packet exists in the reception signal when the delayed cross-correlation value is greater than the predetermined power value and greater than a first false alarm threshold value in each packet searching interval.

5. The packet detecting apparatus of claim 4, wherein when the packet is detected in a specific packet detection searching interval, the packet detector determines in next packet detection searching intervals if the packet exists in the reception signal by using a second false alarm threshold value.

6. The packet detecting apparatus of claim 5, wherein the packet detector determines that the packet exists in the reception signal when the delayed cross-correlation value is greater than the predetermined power value and greater than the second false alarm threshold value.

7. The packet detecting apparatus of claim 6, wherein the packet detector determines that a current packet detection searching interval is a packet detection failure interval when a corresponding interval is greater than a counter value corresponding to a sample time, and re-performs the packet detection in the next packet detection searching interval.

8. A packet detecting method, comprising:
calculating a cross-correlation value of a reception signal received from the outside, and delaying the calculated cross-correlation value by a predetermined sample time;
calculating a power value of the reception signal; and
determining if a packet exists in the reception signal by comparing the delayed cross-correlation value with the calculated power value, and detecting the corresponding packet,
wherein the reception signal includes a zero-padded symbol;
the zero-padded symbol includes time-domain preamble samples and zero-padded suffix samples;
the cross-correlation calculator delays the reception signal by a zero-padded sample time;
the cross-correlation calculator delays the reception signal by a time-domain preamble samples time;
the cross-correlation calculator delays the reception signal by a zero-padded suffix samples time; and
the power calculator accumulates the power value during an interval defined below the zero-padded sample time.

9. The packet detecting method of claim 8, wherein the cross-correlation value is calculated by using a sign component of a conjugate complex number of a preamble sample included in the reception signal.

10. The packet detecting method of claim 8, wherein said detecting of the packet comprises:
determining if the packet exists in the reception signal in each packet searching interval; and
determines that the packet exits in the reception signal when the delayed cross-correlation value is greater than a predetermined power value.

11. The packet detecting method of claim 10, wherein said detecting of the packet comprises determining that the packet exists in the reception signal when the delayed cross-correlation value is greater than the predetermined power value and greater than a first false alarm threshold value in each packet searching interval.

12. The packet detecting method of claim 11, wherein said detecting of the packet comprises, when the packet is detected in a specific packet detection searching interval, determining in next packet detection searching intervals if the packet exists in the reception signal by using a second false alarm threshold value.

13. The packet detecting method of claim 12, wherein said detecting of the packet comprises determining that the packet exists in the reception signal when the delayed cross-correlation value is greater than the predetermined power value and greater than the second false alarm threshold value.

14. The packet detecting method of claim 13, wherein said detecting of the packet comprises:
determining that a current packet detection searching interval is a packet detection failure interval when a corresponding interval is greater than a counter value corresponding to a sample time; and
re-performs the packet detection in the next packet detection searching interval.

15. A packet detecting apparatus, comprising:
a cross-correlation calculator for calculating a cross-correlation value of a reception signal received from the outside and delaying the calculated cross-correlation value by a predetermined sample time;
a power calculator for calculating a power value of the reception signal; and
a packet detector for determining if a packet exists in the reception signal by comparing the delayed cross-correlation value with the calculated power value, and detecting the corresponding packet
wherein the packet detector determines if the packet exists in the reception signal in each packet searching interval, and determines that the packet exists in the reception signal when the delayed cross-correlation value is greater than a predetermined power value and greater than a first false alarm threshold value in each packet searching interval.

16. The packet detecting apparatus of claim 15, wherein when the packet is detected in a specific packet detection searching interval, the packet detector determines in next packet detection searching intervals if the packet exists in the reception signal by using a second false alarm threshold value.

17. The packet detecting apparatus of claim 16, wherein the packet detector determines that the packet exists in the reception signal when the delayed cross-correlation value is greater than the predetermined power value and greater than the second false alarm threshold value.

18. The packet detecting apparatus of claim 17, wherein the packet detector determines that a current packet detection searching interval is a packet detection failure interval when a corresponding interval is greater than a counter value corresponding to a sample time, and re-performs the packet detection in the next packet detection searching interval.

* * * * *